(12) United States Patent
Tomcsak et al.

(10) Patent No.: US 9,348,022 B1
(45) Date of Patent: May 24, 2016

(54) IDENTIFYING OBSTACLES IN A LANDING ZONE

(71) Applicant: Lockheed Martin Corporation, Bethesda, MD (US)

(72) Inventors: Michael A. Tomcsak, Orlando, FL (US); Albert N. Pergande, Orlando, FL (US); Kenneth R. Hollon, Orlando, FL (US); Alexander T. Shepherd, Plant City, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 515 days.

(21) Appl. No.: 14/107,659

(22) Filed: Dec. 16, 2013

(51) Int. Cl.
  *G01S 13/91* (2006.01)
  *G01S 13/93* (2006.01)
  *G01S 13/44* (2006.01)
  (Continued)

(52) U.S. Cl.
  CPC ............... *G01S 13/913* (2013.01); *G01S 13/04* (2013.01); *G01S 13/44* (2013.01); *G01S 13/93* (2013.01)

(58) Field of Classification Search
  CPC ......... G01S 13/02; G01S 13/04; G01S 13/88; G01S 13/91; G01S 13/913; G01S 13/93; G01S 13/9303; G01S 13/94; G01S 7/02; G01S 7/024; G01S 7/025; G01S 7/026; G01S 13/06; G01S 13/42; G01S 13/44; G01S 13/4472; G01S 1/02; G01S 1/08; G01S 1/14; G01S 1/16; G01S 13/74; G01S 13/75; F41G 7/20; F41G 7/2246; F41G 7/2253; F41G 7/226; F41G 7/2273; F41G 7/2286
  USPC ........... 342/27, 28, 29, 175, 188, 195, 33–35, 342/61, 63–65, 62, 147–154, 350, 351, 342/361–366, 385, 386, 407, 408; 701/300, 701/301; 244/3.1, 3.15–3.19
  See application file for complete search history.

(56) References Cited

U.S. PATENT DOCUMENTS

| | | | | |
|---|---|---|---|---|
| 3,680,111 | A | * | 7/1972 | Killion ................... G01S 13/75 342/33 |
| 3,713,159 | A | * | 1/1973 | Hoffman ................... G01S 1/02 342/386 |
| 4,268,832 | A | * | 5/1981 | Christian ................. G01S 1/16 342/366 |

(Continued)

FOREIGN PATENT DOCUMENTS

GB  2083725 A  *  3/1982  ............. G01S 7/025

OTHER PUBLICATIONS

Paulose, Abraham Thomas, "High Radar Range Resolution with the Step Frequency Waveform," Thesis submitted in partial fulfillment of the requirements for the degree of Master of Science in Electrical Engineering from the Naval Postgraduate School, Monterey, California, Jun. 1994, 104 pages.

*Primary Examiner* — Bernarr Gregory
(74) *Attorney, Agent, or Firm* — Withrow & Terranova, PLLC (57) ABSTRACT

Mechanisms for identifying obstacles in a landing zone are disclosed. A first polarization elevation angle matrix is generated based on reflected radar signals having a first polarization sense. A second polarization elevation angle matrix based on reflected radar signals having a second polarization sense that differs from the first polarization sense is generated. The first polarization elevation angle matrix and the second polarization elevation angle matrix are integrated to form an integrated elevation angle matrix that identifies first scatterers and second scatterers with respect to the landing zone.

20 Claims, 8 Drawing Sheets

(51) Int. Cl.
  *G01S 13/04* (2006.01)
  *G01S 13/00* (2006.01)

(56) References Cited

U.S. PATENT DOCUMENTS

| | | | | |
|---|---|---|---|---|
| 4,766,435 A * | 8/1988 | Wells | ............ | G01S 7/026 342/188 |
| 4,829,303 A * | 5/1989 | Zebker | ............ | G01S 7/024 342/195 |
| 4,849,762 A * | 7/1989 | Barnes | ............ | G01S 7/024 342/188 |
| 5,208,601 A * | 5/1993 | Hart | ............ | G01S 13/913 342/33 |
| 5,264,856 A * | 11/1993 | Thurlow | ............ | G01S 7/025 342/188 |
| 5,359,334 A * | 10/1994 | Gutman | ............ | G01S 13/913 342/408 |
| 5,552,787 A * | 9/1996 | Schuler | ............ | G01S 7/024 342/188 |
| 7,355,546 B2 * | 4/2008 | Randall | ............ | G01S 7/024 342/188 |
| 7,623,064 B2 * | 11/2009 | Calderbank | ............ | G01S 7/024 342/188 |
| 7,633,429 B1 | 12/2009 | Liu et al. | | |
| 7,825,847 B2 * | 11/2010 | Fujimura | ............ | G01S 7/025 342/188 |

\* cited by examiner

IDENTIFYING OBSTACLES IN A LANDING ZONE

TECHNICAL FIELD

The embodiments relate to radar and, in particular, to the use of radar to identify obstacles in a landing zone.

BACKGROUND

Aircraft, such as helicopters or vertically-landing airplanes, are often forced to choose a landing zone on unprepared ground. Rotor downdraft, poor weather, darkness, and other factors can make obstacles that have a relatively small radar cross-section, such as posts, wires, debris, and minor topological features, difficult to discern, either visually or via radar. This is sometimes referred to as a degraded visual environment (DVE). A DVE can result in hard or catastrophic landings, resulting in death, injury and/or equipment damage.

Numerous solutions have been proposed to aid pilots in such circumstances, but few have proven successful. In general, the radar returns of typical landing zone hazards are too low to be detected with a radar power return, rendering dangerous obstacles invisible to a pilot.

SUMMARY

The embodiments relate to identifying obstacles in a landing zone, particularly in a degraded visual environment. Obstacles may include natural topographic features, man-made items fixed to the land, debris, or any other item that may impede the landing of an aircraft. Generally, the embodiments utilize monopulse radar and polarization diversity to generate an elevation angle map that identifies radar scatterers in the landing zone. The elevation angle map may be used to generate real-time visual information of the landing zone that can be used by a pilot to avoid obstacles during a landing, increasing the margin of safety.

In one embodiment, a method for identifying obstacles in a landing zone is provided. A first polarization elevation angle matrix based on reflected radar signals having a first polarization sense is generated. The first polarization elevation angle matrix corresponds to the landing zone and identifies an elevation angle of each of a plurality of first scatterers in the landing zone. A second polarization elevation angle matrix based on reflected radar signals having a second polarization sense that differs from the first polarization sense is generated. The second polarization elevation angle matrix also corresponds to the landing zone and identifies an elevation angle of each of a plurality of second scatterers in the landing zone. The first polarization elevation angle matrix and the second polarization elevation angle matrix are integrated to form an integrated elevation angle matrix that identifies the first scatterers and the second scatterers with respect to the landing zone.

In one embodiment, an image representative of heights of at least some of the first scatterers and some of the second scatterers with respect to the landing zone is generated based on the integrated elevation angle matrix. The image may then be presented on a display for use by a pilot in landing the aircraft safely. In one embodiment, a threshold height or elevation is determined, and, based on the integrated elevation angle matrix, each first scatterer and each second scatterer having a height above the threshold height is determined. An image is generated that is representative of the height of each first scatterer and each second scatterer having a height above the threshold height with respect to the landing zone. This embodiment eliminates from the display first scatterers and second scatterers that are immaterial from a landing perspective.

In another embodiment, a radar assembly is provided. The radar assembly includes a transmitter coupled to an antenna, a receiver coupled to the antenna, and a controller coupled to the transmitter and the receiver. The controller is configured to generate a first polarization elevation angle matrix based on reflected radar signals having a first polarization sense. The first polarization elevation angle matrix corresponds to the landing zone and identifies an elevation angle of each of a plurality of first scatterers in the landing zone. The controller is further configured to generate a second polarization elevation angle matrix based on reflected radar signals having a second polarization sense that differs from the first polarization sense. The second polarization elevation angle matrix also corresponds to the landing zone and identifies an elevation angle of each of a plurality of second scatterers in the landing zone. The controller is further configured to integrate the first polarization elevation angle matrix and the second polarization elevation angle matrix to form an integrated elevation angle matrix that identifies the first scatterers and the second scatterers with respect to the landing zone.

In another embodiment, a radar system for use in an aircraft is provided. The radar system includes a missile interface configured to communicate with a radar assembly in a missile, and a controller coupled to the missile interface. The controller is configured to generate a first polarization elevation angle matrix based on first radar data received via the missile interface. The first radar data is based on reflected radar signals having a first polarization sense. The first polarization elevation angle matrix corresponds to the landing zone and identifies an elevation angle of each of a plurality of first scatterers in the landing zone.

The controller is further configured to generate a second polarization elevation angle matrix based on second radar data received via the missile interface. The second radar data is based on reflected radar signals having a second polarization sense that differs from the first polarization sense. The second polarization elevation angle matrix also corresponds to the landing zone and identifies an elevation angle of each of a plurality of second scatterers in the landing zone. The controller is configured to integrate the first polarization elevation angle matrix and the second polarization elevation angle matrix to form an integrated elevation angle matrix that identifies the first scatterers and the second scatterers with respect to the landing zone.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first data" and "second data," and does not imply a priority, a type, an importance, or other attribute, unless otherwise stated herein.

The embodiments relate to resolving identifying obstacles in a landing zone, particularly in a degraded visual environment. Obstacles may include natural topographic features, man-made items fixed to the land, debris, or any other item that may impede the landing of an aircraft. Generally, the embodiments utilize monopulse radar and diversity polarization and to generate an elevation angle map that identifies radar scatterers in the landing zone. The elevation angle map may be used to generate real-time visual information of the landing zone that can be used by a pilot to avoid obstacles during a landing, increasing the margin of safety.

The phrase "radar scatterers" as used herein refers to objects that cause a reflection of radar signals. Thus, a radar scatterer may simply be the terrain, or may be a man-made item fixed to the land, may be debris, or may be any other item that results in a radar return. The phrase "obstacle" as used herein generally refers to radar scatterers that may be problematic from a landing standpoint. In some embodiments, the elevation angle map described herein, is used by a pilot to visually distinguish what may be dangerous obstacles from other radar scatterers.

Figure 1:
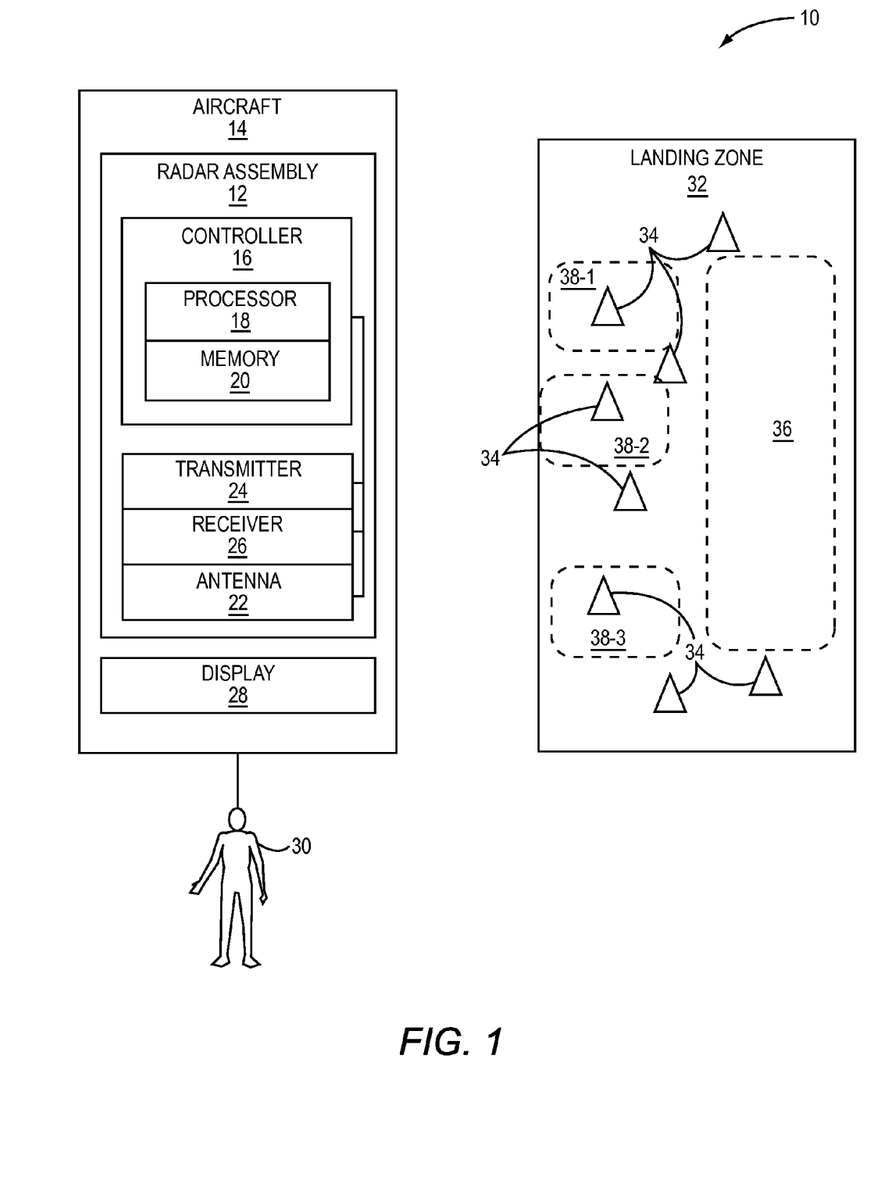
FIG. 1 is a block diagram illustrating a system in which embodiments may be practiced.

FIG. 1 is a block diagram illustrating a system 10 in which embodiments may be practiced. The system 10 includes a radar assembly 12 that may, in some embodiments, be mounted or otherwise coupled to an aircraft 14, such as a helicopter, or vertically-landing airplane.

The radar assembly 12 includes a controller 16, which includes a processor 18 and a memory 20. The controller 16, processor 18, and memory 20 may be used to perform signal processing on radar return information, as described in greater detail herein, as well as to provide overall control of the functionality discussed herein. The processor 18 may execute software instructions loaded from a storage device (not illustrated) to implement all or part of the functionality herein. In alternative embodiments, some or all of the functionality described herein may be performed with dedicated circuitry, including any combination of digital signal processors, application specific circuits, field-programmable gate arrays, and the like.

All or a portion of the functionality may also be implemented as a computer program product stored on a transitory or non-transitory computer-usable or computer-readable storage medium. The computer program product can comprise software instructions for implementing the functionality of the embodiments described herein when executed on the processor 18.

The radar assembly 12 includes an antenna 22, a transmitter 24 coupled to the antenna 22 and configured to transmit radar signals via the antenna 22, and a receiver 26 coupled to the antenna 22 and configured to receive radar signals via the antenna 22. It will be appreciated that the radar assembly 12 may have many additional components suitable or appropriate in a radar system, such as a switch to selectively couple the transmitter 24 and the receiver 26 to the antenna 22 at appropriate times, which are not illustrated herein.

The radar assembly 12 comprises a monopulse radar assembly that provides signal polarization, and sum and difference (sometimes referred to as delta) information for radar return information. The radar assembly 12 may include multiple channels, such as a sum channel and a single elevation difference channel, or, in other embodiments, a sum channel, an elevation difference channel, and an azimuth difference channel. In other embodiments, a single channel may be used and sum and difference radar return information may be multiplexed over the single channel.

In one embodiment, the radar assembly 12 comprises an active Ka-band millimeter-wave radar that is capable of generating a stepped frequency high range resolution (HRR) waveform. Such radar assemblies are sometimes used, for example, in guidance systems of missiles. In some embodiments, the radar assembly 12 comprises a relatively high-frequency radar assembly having a frequency range between about 10 GHz and about 100 GHz.

The aircraft 14 also includes one or more displays 28 (only one illustrated), which may include one or more flat panel display screens, as well as one or more head-mounted display surfaces, or a heads-up display. As will be discussed in greater detail herein, in some embodiments imagery may be presented to a pilot 30 via the display 28 identifying the elevations, or heights, of scatterers identified in a landing zone 32.

The landing zone 32 is illustrated having a rectangular shape for purposes of illustration, but the landing zone 32 could comprise any shape. The landing zone 32 may include a plurality of objects 34, some or all of which may be problematic from a landing standpoint. A respective object 34 may have a small radar cross-section, and be virtually invisible to the pilot 30 above the landing zone 32, either due to size, weather, darkness, rotor downdraft, or the like. Yet, even relatively small objects 34, such as an 18-inch length of rebar protruding from the ground, or a cinder block, may cause catastrophic problems if they impact an aircraft 14 during landing. Consequently, it would be preferable for the pilot 30 to land in an area 36, which is devoid of any objects 34 that may negatively impact a landing, rather than any of the areas 38-1-38-3, each of which may include an object 34 that could negatively impact the landing.

Figure 2:
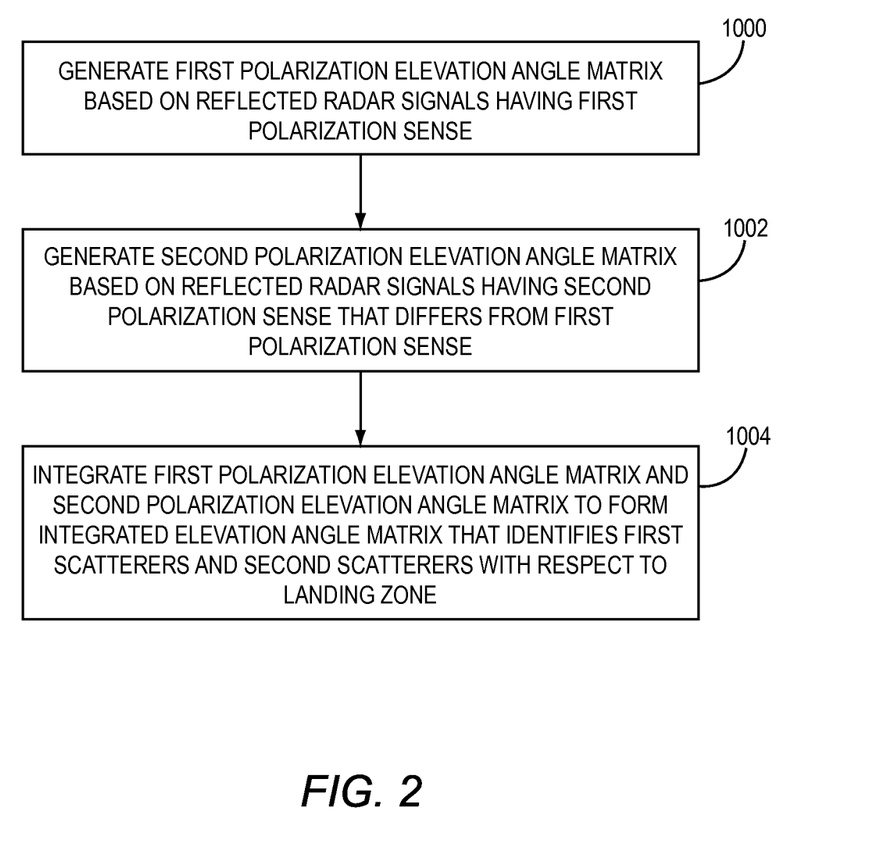
FIG. 2 is a flowchart of a method for identifying obstacles in a landing zone according to one embodiment.

A typical radar power return may not resolve any of the objects 34, due to their relatively small radar cross section. Embodiments herein utilize multiple different polarizations, and a stepped frequency high range resolution (HRR) waveform that is able to resolve relatively small objects 34. In this regard, FIG. 2 is a flowchart of a method for identifying obstacles in a landing zone according to one embodiment. FIG. 2 will be discussed in conjunction with FIG. 1. The radar assembly 12 generates a first polarization elevation angle matrix based on reflected radar signals having a first polarization sense (FIG. 2, block 1000). The first polarization elevation angle matrix corresponds to the landing zone 32 and identifies an elevation angle of each of a plurality of first scatterers in the landing zone 32. The first polarization sense may comprise any suitable signal polarization, such as vertical polarization, horizontal polarization, left hand circular polarization (LHCP), right hand circular polarization (RHCP), or the like.

The radar assembly 12 generates a second polarization elevation angle matrix based on reflected radar signals having a second polarization sense (FIG. 2, block 1002). The second polarization elevation angle matrix also corresponds to the landing zone 32 and identifies an elevation angle of each of a plurality of second scatterers in the landing zone 32. The second polarization sense is different from the first polarization sense. For example, if the first polarization sense is a vertical polarization, the second polarization sense may comprise a horizontal polarization. Alternatively, if the first polarization sense is a LHCP, the second polarization sense may comprise a RHCP.

The radar assembly 12 then integrates the first polarization elevation angle matrix and the second polarization elevation angle matrix to form an integrated elevation angle matrix that identifies the first scatterers and the second scatterers with respect to the landing zone 32 (FIG. 2, block 1004). The integrated elevation angle matrix can be used to generate, for example, an image representative of a height of at least some of the first scatterers and some of the second scatterers with respect to the landing zone 32. The image can be presented on the display 28 to the pilot 30 for use in landing the aircraft 14 and avoiding one or more of the objects 34. In one embodiment, the integrated elevation angle matrix comprises a plurality of cells, and each cell comprises an elevation angle that identifies an elevation of at least one scatterer within a corresponding area of the landing zone 32.

Figure 3:
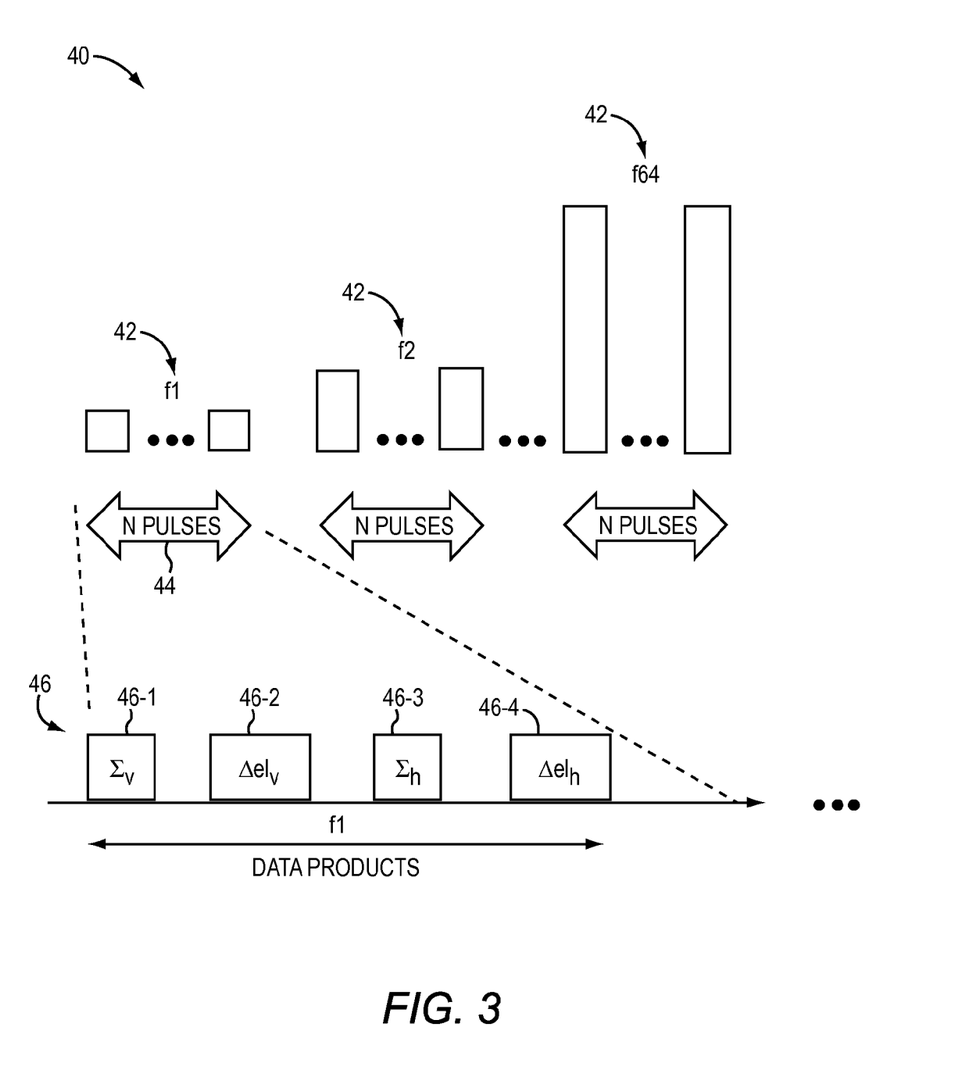
FIG. 3 is a block diagram of a high range resolution waveform according to one embodiment.

Prior to delving into greater detail of the embodiments, a brief discussion regarding a stepped frequency HRR waveform will be discussed herein. FIG. 3 is a block diagram of a HRR waveform 40 according to one embodiment. The transmitter 24, for each frequency 42 of a plurality of frequencies 42, initiates a series of pulses 44. For each pulse 44, the receiver 26 may receive a radar return, in the way of reflected energy, from which a number of different data products 46 can be determined. The data products 46 may include a vertical polarization sum channel data product 46-1 that identifies the sum channel response of the antenna 22 in response to the transmission of a pulse 44 at frequency f1 having a vertical polarization. The data products 46 may include a vertical polarization difference channel data product 46-2 that identifies the difference channel response of the antenna 22 in response to the transmission of the pulse 44 at frequency f1 having a vertical polarization. The data products 46 may include a horizontal polarization sum channel data product 46-3 that identifies the sum channel response of the antenna 22 in response to the transmission of a pulse 44 at frequency f1 having a horizontal polarization. The data products 46 may include a horizontal polarization difference channel data product 46-4 that identifies the difference channel response of the antenna 22 in response to the transmission of the pulse 44 at frequency f1 having a horizontal polarization.

Assuming, for example, an even polarization sense, such as LHCP, and an odd polarization sense, such as RHCP, the data products 46 data could include sum azimuth even polarization, delta azimuth even polarization, sum azimuth odd polarization, delta azimuth odd polarization, sum elevation even polarization, delta elevation even polarization, sum elevation odd polarization, and delta elevation odd polarization.

Figure 4:
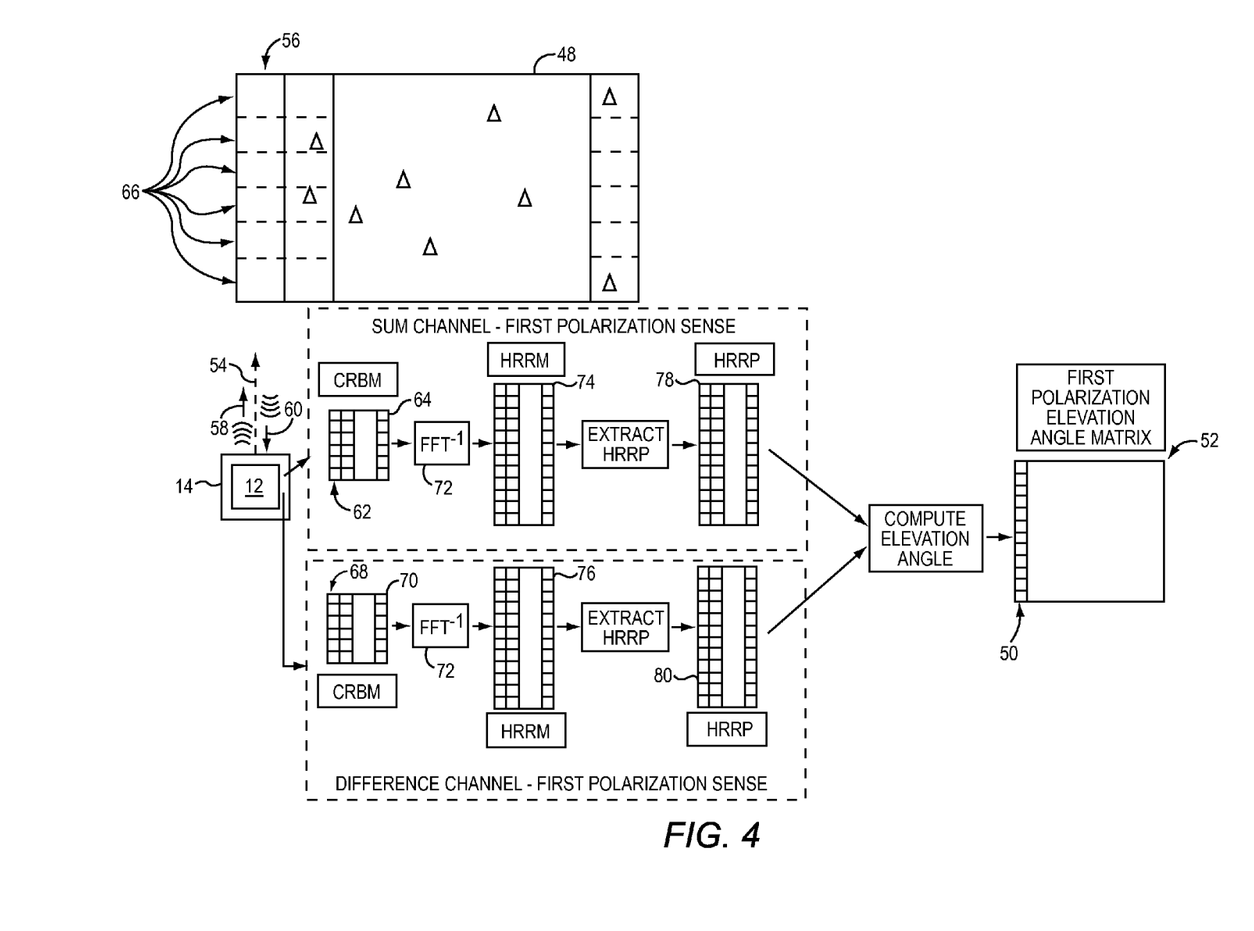
FIG. 4 is a block diagram illustrating the generation of a first polarization elevation angle matrix according to one embodiment.
Figure 5:
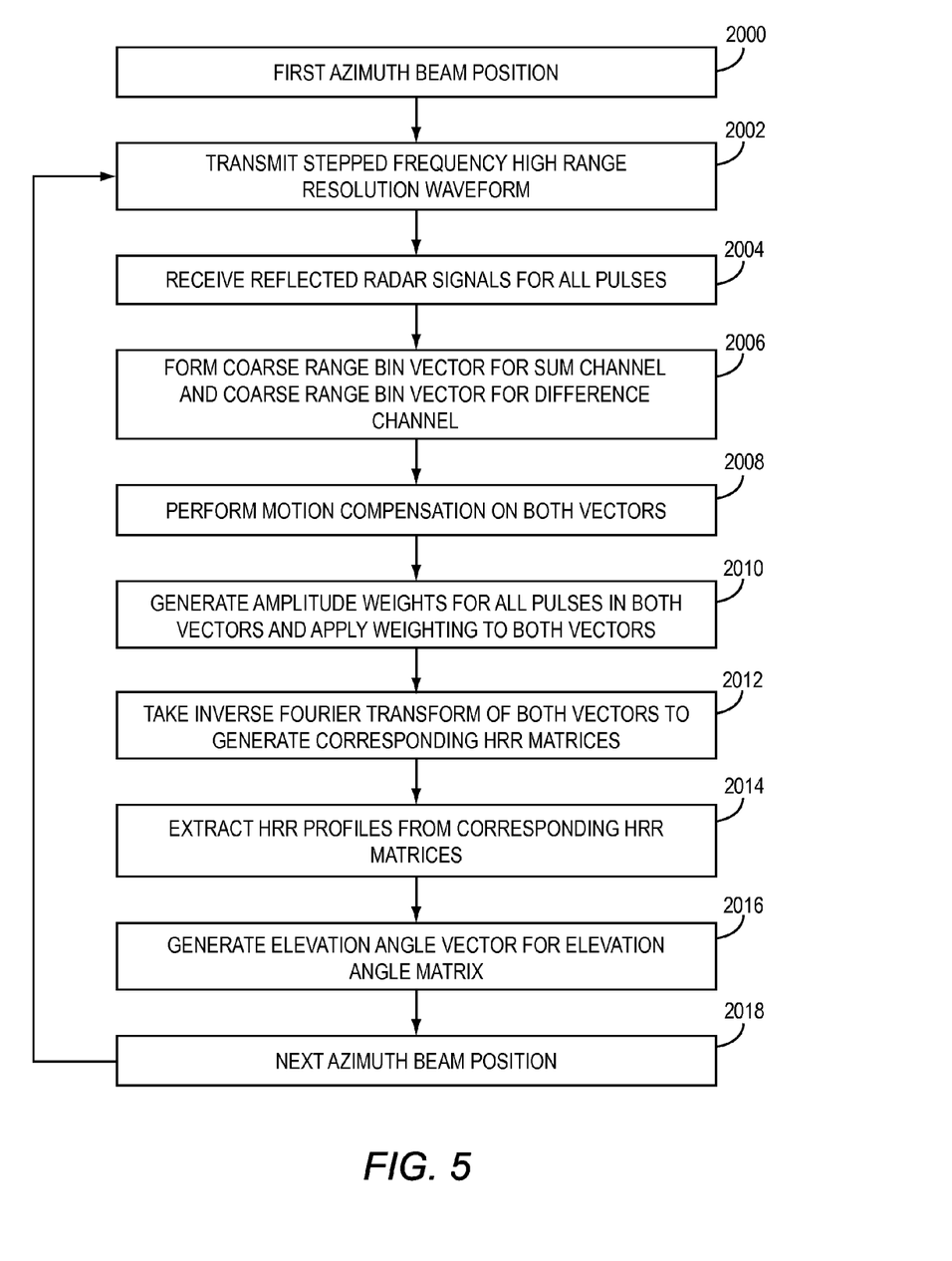
FIG. 5 is a flowchart of a method for determining a polarization elevation angle matrix according to one embodiment.

FIG. 4 is a block diagram illustrating the generation of a first polarization elevation angle matrix according to one embodiment. FIG. 5 is a flowchart of a method for determining a polarization elevation angle matrix according to one embodiment, and will be discussed in conjunction with FIG. 4. For purposes of illustration, assume the radar assembly 12 is in the aircraft 14 at an altitude above a landing zone 48. The generation of a single column, or vector 50, of a first polarization elevation angle matrix 52 will now be discussed. The vector 50 corresponds to an azimuth beam position 54 of the antenna 22 (not illustrated), which illuminates a swath 56 of the landing zone 48. The vector 50 thus contains information, as described in detail herein, that corresponds to the swath 56 of the landing zone 48. It should be noted that the cells, rows, and columns of the matrices illustrated in FIG. 4 are merely representative, and do not necessarily show an actual correspondence between such matrices, or depict an actual number of rows, columns, or cells that would be utilized while practicing the embodiments disclosed herein. In fact, the amount of data contained in the radar return of a stepped frequency HRR waveform illuminating terrain may be relatively voluminous, depending on the characteristics of the stepped frequency HRR waveform as discussed with regard to FIG. 3.

Referring now to FIG. 5, for purposes of illustration the process will be described for a first azimuth beam position 54 of the antenna 22 and a first polarization sense. The process may then be repeated for a second polarization sense, and for each of a plurality of azimuth beam positions 54, as the antenna 22 scans the landing zone 48 along the azimuth.

Initially, the radar assembly 12 transmits a stepped frequency HRR waveform 58 having a first polarization sense toward the landing zone 48 (FIG. 5, blocks 2000-2002). The first polarization sense can be any desired polarization, such as vertical polarization, horizontal polarization, LHCP or RHCP. The radar assembly 12, via the receiver 26, receives reflected energy having the first polarization sense in the form of radar return signals 60 that reflected off of scatterers in the landing zone 48 and that have the first polarization sense (FIG. 5, block 2004). From the radar return signals 60, the radar assembly 12, via the controller 16, forms a coarse range bin vector 62 in a first polarization sum channel coarse range bin matrix ("CRBM") 64 based on the sum channel of the antenna 22. The bins in the first polarization sum channel CRBM 64 may correspond to range bins 66 that comprise time-based subdivisions of the swath 56 formed by range gates in the receiver 26. From the radar return signals 60, the radar assembly 12 also forms a coarse range bin vector 68 in a first polarization difference channel coarse range bin matrix 70 based on the difference channel of the antenna 22 (FIG. 5, block 2006).

The controller 16 may perform motion compensation on the coarse range bin vectors 62, 68 to eliminate motion caused by the aircraft 14 (FIG. 5, block 2008). In some embodiments this may involve a Doppler correction function.

The controller 16 may also generate amplitude weights for all pulses and apply the weighting to the coarse range bin vectors 62, 68 to, for example, lower sidelobes of an antenna pattern (FIG. 5, block 2010). The controller 16 may then perform an inverse Fourier transform function 72 to generate HRR matrices ("HRRMs") 74, 76 based on the coarse range bin vectors 62, 68, respectively (FIG. 5, block 2012). The controller 16 then extracts corresponding HRR profiles ("HRRPs") 78, 80 from HRRMs 74, 76 (FIG. 5, block 2014). The HRRPs 78, 80 define the landing zone 48 in substantially higher resolution than the resolution of the coarse range bin vectors 62, 68, and are essentially subdivisions of the coarse range bins. For example, each entry in the coarse range bin vectors 62, 68 could correspond to a 10 meter resolution of the landing zone 48, whereas each entry in the HRRPs 78, 80 could correspond to a 1 foot resolution within the landing zone 48.

The controller 16 then generates the vector 50 in the first polarization elevation angle matrix 52 based on the HRR matrices 74, 76 (FIG. 5, block 2016). In particular, according to one embodiment, the controller 16 generates the vector 50 according to the following formulas:

Ratio=Real[($\Delta^*\Sigma'$)/($\Sigma^*\Sigma'$)]

Elevation_Angle=Elevation S-Curve Table(Ratio)+ Reference wherein $\Delta$ identifies the difference channel response, $\Sigma$ identifies the sum channel response, "'" is the complex conjugate operator, Elevation S-Curve Table is a table, or function, that is based on the elevation S-curve of the antenna 22, and Reference is a reference height, or elevation.

Broadly, this formula estimates the elevation angle by calculating the real part of the ratio of the difference channel response normalized to the sum channel response, and comparing it to the monopulse response curve of the antenna 22. This provides the angle off of boresight to the dominant scatterer in the respective cell. Utilizing trigonometry, and given the known altitude of the aircraft 14 and the line of sight pointing angle of the antenna 22, the elevation or altitude of the dominant scatterer can then be identified.

This process may then be repeated for the second polarization sense for the azimuth beam position 54 to generate a vector in a second polarization elevation angle matrix. As discussed above, the process may then be repeated for each of a plurality of azimuth beam positions 54 as the antenna 22 scans the landing zone 48 along the azimuth (FIG. 5, block 2018). After the antenna scans completely across the landing zone 48, the first polarization elevation angle matrix and the second polarization elevation angle matrix can be integrated to form an integrated elevation angle matrix that identifies the first scatterers and the second scatterers with respect to the landing zone 48.

Figure 6:
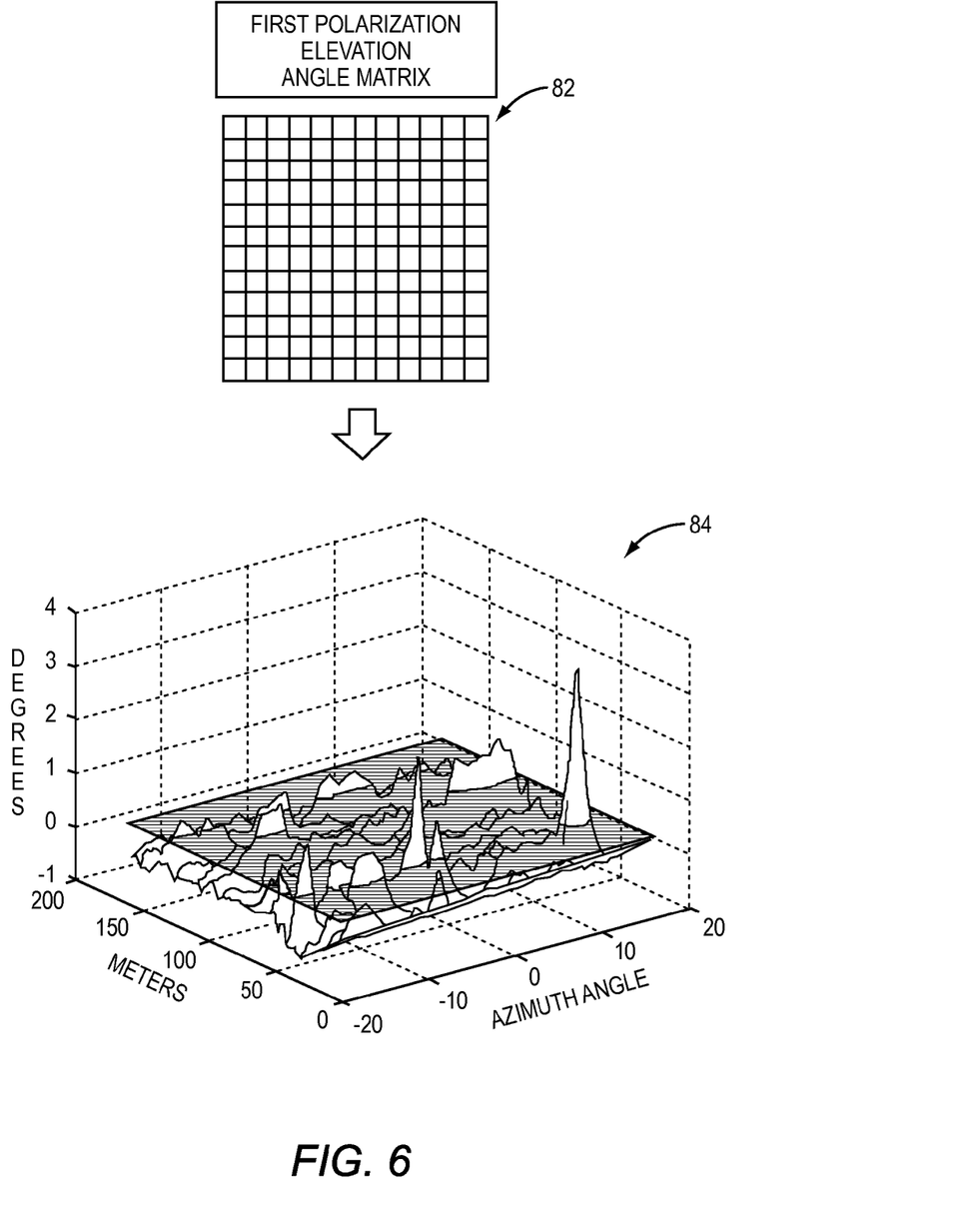
FIG. 6 illustrates a first polarization elevation angle matrix according to one embodiment.

FIG. 6 illustrates a first polarization elevation angle matrix 82 of a landing zone according to one embodiment. A three-dimensional graph 84 of the data in the first polarization elevation angle matrix 82 is also illustrated. As depicted in the graph 84, the radar return information in the first polarization sense resulted in the identification of scatterers in certain locations of the landing zone that are significantly elevated above the terrain compared to other scatterers. While the scale of the Z-axis is in terms of angle degrees, the scale may be in terms of any desirable unit, such as feet, meters, yards, or the like. Thus the first polarization elevation angle matrix 82 may be used by the controller 16 to generate an image that is representative of a height of the scatterers based on the first polarization sense, and present such information on the display 28 for presentation to the pilot 30.

In one embodiment, the controller 16 may determine a threshold height or elevation, and determine, based on the integrated elevation angle matrix, each first scatterer and each second scatterer that has a height above the threshold height. The controller 16 may generate an image representative of the height of each first scatterer and each second scatterer having a height above the threshold height with respect to the landing zone, and present the image on the display 28 for presentation to the pilot 30.

Figure 7:
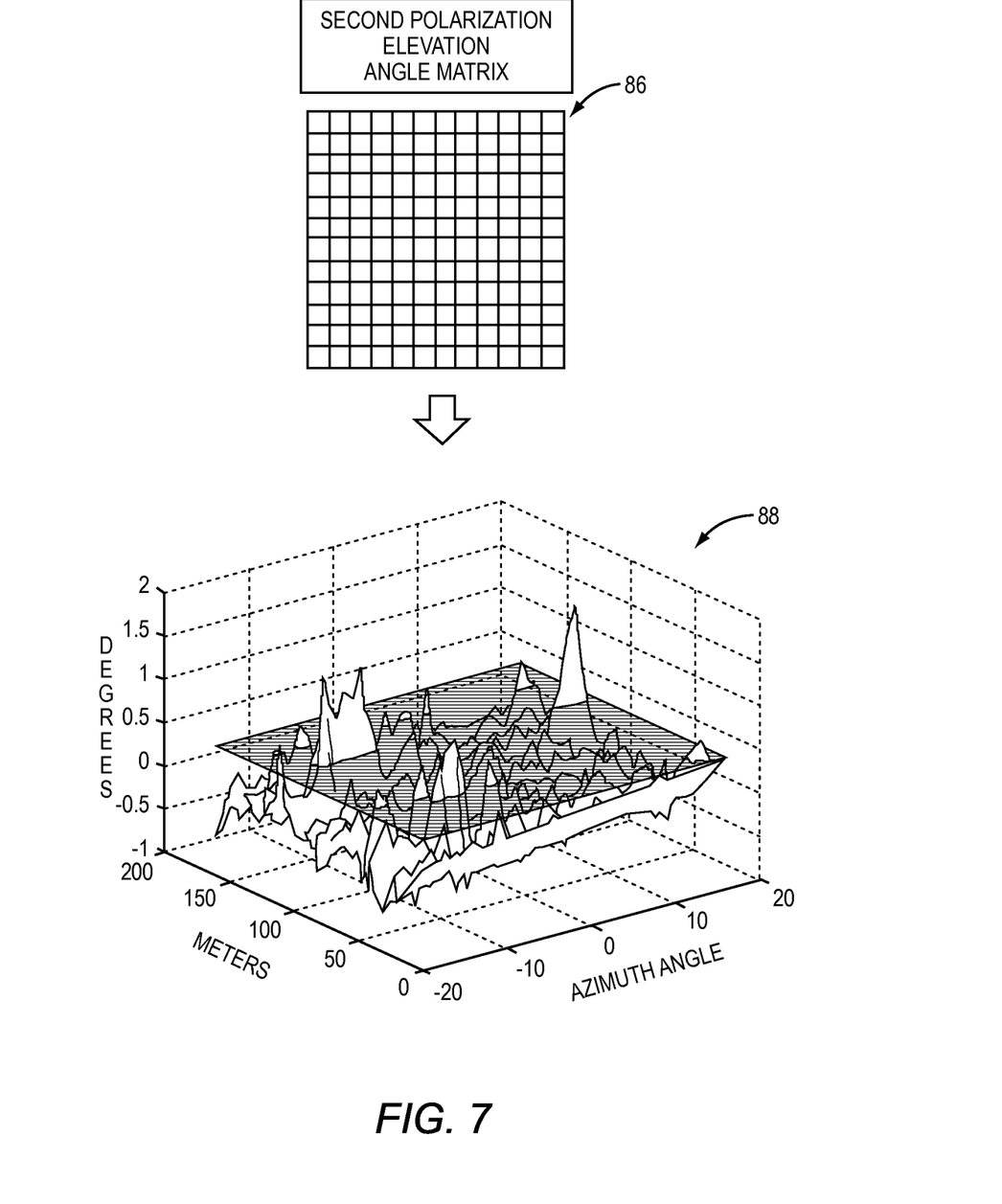
FIG. 7 illustrates a second polarization elevation angle matrix according to one embodiment.

FIG. 7 illustrates a second polarization elevation angle matrix 86 of a landing zone according to one embodiment. A three-dimensional graph 88 of the data in the second polarization elevation angle matrix 86 is also illustrated. As depicted in the graph 88, the radar return information in the second polarization sense resulted in the identification of scatterers in certain locations of the landing zone that are significantly elevated above the terrain compared to other scatterers. While the scale of the Z-axis is in terms of angle degrees, the scale may be in any desirable unit, such as feet, meters, yards, or the like. Notably, certain scatterers not identified using the first polarization sense, as illustrated in the graph 84, are identified in the graph 88, and vice versa.

The controller 16 integrates the first polarization elevation angle matrix 82 and the second polarization elevation angle matrix 86 to form an integrated elevation angle matrix. The controller 16 can utilize the integrated elevation angle matrix to generate imagery, similar to that depicted in the graphs 84, 88, or in any other form, that correlates the scatterers to the respective landing zone. The imagery may by presented by itself, or overlayed upon other imagery. In one embodiment, the imagery may be registered with and overlaid on top of real-time imagery captured by a camera in the aircraft 14, and presented to the pilot 30.

Figure 8:
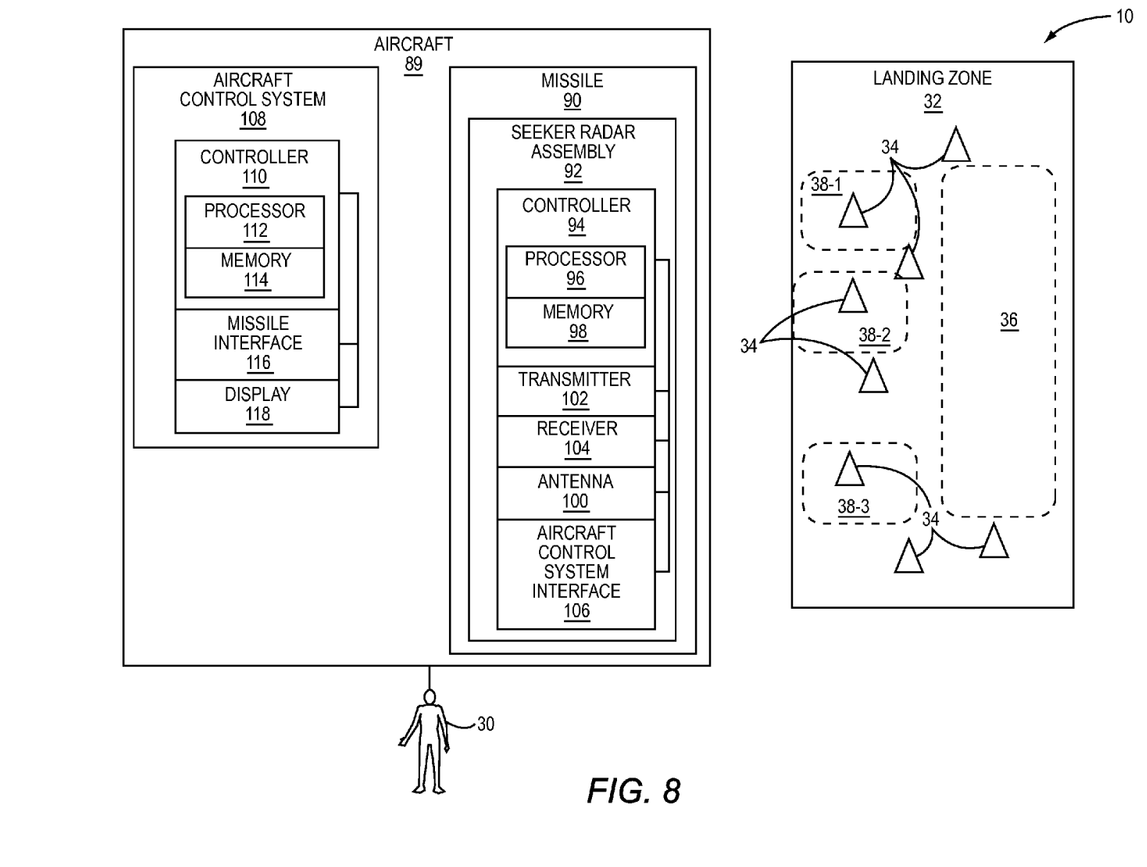
FIG. 8 is a block diagram of an aircraft control system according to one embodiment.

FIG. 8 is a block diagram of an aircraft control system according to one embodiment. In this embodiment, an aircraft 89, which may be similar in many respects to the aircraft 14 discussed with regard to FIG. 1, has a missile 90 mounted thereon. The missile 90 includes a seeker radar assembly 92 that includes a controller 94, a processor 96, and a memory 98. The seeker radar assembly 92 also includes an antenna 100, a transmitter 102 configured to transmit radar signals via the antenna 100, and a receiver 104 configured to receive radar return signals via the antenna 100. The seeker radar assembly 92 also includes an aircraft control system interface 106 that facilitates communication between the seeker radar assembly 92 and an aircraft control system 108 of the aircraft 14.

The seeker radar assembly 92 is utilized by the missile 90, after being fired from the aircraft 89, to guide the missile to an intended target. The seeker radar assembly 92 may utilize a stepped frequency HRR waveform and monopulse radar components that provide signal polarization, such as those described above with regard to FIG. 1. In this embodiment, the aircraft 89 utilizes the seeker radar assembly 92 of the missile 90 for acquisition of the data utilized to generate an integrated elevation angle matrix that corresponds to the landing zone 32.

In particular, the aircraft control system 108 includes a controller 110, a processor 112, and a memory 114. The controller 110, processor 112, and memory 114 may be used to perform signal processing functions on radar return information obtained from the seeker radar assembly 92, as described in greater detail herein, as well as provide overall control of the functionality discussed herein. In some embodiments, the processor 112 may execute software instructions loaded from a storage device (not illustrated) to implement all or part of the functionality herein. In alternative embodiments, some or all of the functionality described herein may be performed with dedicated circuitry, including any combination of digital signal processors, application specific circuits, field-programmable gate arrays, and the like.

The controller 110 communicates with the seeker radar assembly 92 via a missile interface 116. The controller 110 may direct the seeker radar assembly 92 to activate the transmitter 102, antenna 100, and receiver 104 to begin an azimuth scan across the landing zone 32, similar to the functionality implemented by the transmitter 24, receiver 26, and antenna 22 discussed above with regard to FIG. 1. As the receiver 104 receives radar return data, the receiver 104 may provide the radar return data to the controller 110 via the aircraft control system interface 106. The aircraft control system interface 106 can be coupled to the missile interface 116 via any suitable wired or wireless communication link, and utilize any desired communications protocol.

The receiver 104 may provide first return data that comprises data products 46 associated with a first polarization sense, and second return data that comprises data products 46 associated with a second polarization sense. The controller 110, similar to the process described above with regard to FIGS. 4 and 5, generates a first polarization elevation angle matrix based on the first return data received via the missile interface 116. The first return data is based on reflected radar signals having the first polarization sense. The controller 110 also generates a second polarization elevation angle matrix based on the second return data received via the missile interface 116. The second return data is based on reflected radar signals having the second polarization sense.

The controller 110 then integrates the first polarization elevation angle matrix and the second polarization elevation angle matrix to form an integrated elevation angle matrix that identifies the first scatterers and the second scatterers with respect to the landing zone 32. The controller 110 can generate, based on the integrated elevation angle matrix, an image representative of heights of at least some of the first scatterers and some of the second scatterers with respect to the landing zone 32 and present the image on a display 118.

In one embodiment, the controller 110 may determine a threshold height or elevation, and determine, based on the integrated elevation angle matrix, each first scatterer and each second scatterer that has a height above the threshold height. The controller 110 may generate an image representative of the height of each first scatterer and each second scatterer having a height above the threshold height with respect to the landing zone 32, and present the image on the display 118.

The integrated elevation angle matrix may also be utilized to identify the slope of the terrain of the landing zones 32, 48. In one embodiment, a horizontal plane may be fitted to the integrated elevation angle matrix and the slope of the terrain may be identified and provided to the pilot 30 to further aid in either landing the aircraft, or choosing another landing zone.

Those skilled in the art will recognize improvements and modifications to the preferred embodiments of the present disclosure. All such improvements and modifications are considered within the scope of the concepts disclosed herein and the claims that follow.

What is claimed is:

1. A method for identifying obstacles in a landing zone, comprising:
    generating, by a controller comprising a processor, a first polarization elevation angle matrix based on reflected radar signals having a first polarization sense, the first polarization elevation angle matrix corresponding to the landing zone and identifying an elevation angle of each of a plurality of first scatterers in the landing zone;
    generating a second polarization elevation angle matrix based on reflected radar signals having a second polarization sense that differs from the first polarization sense, the second polarization elevation angle matrix corresponding to the landing zone and identifying an elevation angle of each of a plurality of second scatterers in the landing zone; and
    integrating the first polarization elevation angle matrix and the second polarization elevation angle matrix to form an integrated elevation angle matrix that identifies the first scatterers and the second scatterers with respect to the landing zone.

2. The method of claim 1, wherein generating the first polarization elevation angle matrix further comprises:
    transmitting, for an azimuth beam position of a plurality of azimuth beam positions within the landing zone, by an antenna, radar signals comprising a stepped frequency high range resolution (HRR) waveform having the first polarization sense;
    receiving the reflected radar signals having the first polarization sense from the transmitted radar signals;
    generating, based on the reflected radar signals, a first polarization sum channel coarse range bin matrix and a first polarization difference channel coarse range bin matrix;
    generating, based on the first polarization sum channel coarse range bin matrix, a first polarization sum channel HRR profile;
    generating, based on the first polarization difference channel coarse range bin matrix, a first polarization difference channel HRR profile; and
    generating, based on the first polarization sum channel HRR profile and the first polarization difference channel HRR profile, a plurality of cells in the first polarization elevation angle matrix that correspond to areas in the landing zone within the azimuth beam position.

3. The method of claim 2, wherein each cell of the plurality of cells comprises an elevation angle that identifies an elevation of at least one first scatterer or second scatterer within a corresponding area of the landing zone.

4. The method of claim 1, further comprising:
    generating, based on the integrated elevation angle matrix, an image representative of a height of at least some of the first scatterers and some of the second scatterers with respect to the landing zone; and
    presenting the image on a display.

5. The method of claim 4, further comprising:
    determining a threshold height;
    determining, based on the integrated elevation angle matrix, each first scatterer and each second scatterer having a height above the threshold height; and
    generating the image representative of the height of each first scatterer and each second scatterer having a height above the threshold height with respect to the landing zone.

6. The method of claim 1, wherein the first polarization elevation angle matrix comprises a plurality of cells, each cell corresponding to an area in the landing zone, and comprising an elevation angle that identifies an elevation of at least one first scatterer or second scatterer within the area.

7. The method of claim 1, wherein at least some of the first scatterers are the same scatterers as some of the second scatterers.

8. The method of claim 1, wherein the first polarization elevation angle matrix is generated based on a sum channel and at least one difference channel of a monopulse antenna.

9. The method of claim 8, wherein the second polarization elevation angle matrix is generated based on the sum channel and the at least one difference channel of the monopulse antenna.

10. The method of claim 1, wherein the controller is associated with an aircraft, and wherein generating the first polarization elevation angle matrix based on the reflected radar signals further comprises:

receiving, by the controller via a missile interface, return data generated in response to the reflected radar signals from a radar assembly in a missile coupled to the aircraft.

11. A radar assembly, comprising:
a transmitter coupled to an antenna;
a receiver coupled to the antenna; and
a controller coupled to the transmitter and the receiver and configured to:
generate a first polarization elevation angle matrix based on reflected radar signals having a first polarization sense, the first polarization elevation angle matrix corresponding to a landing zone and identifying an elevation angle of each of a plurality of first scatterers in the landing zone;
generate a second polarization elevation angle matrix based on reflected radar signals having a second polarization sense that differs from the first polarization sense, the second polarization elevation angle matrix corresponding to the landing zone and identifying an elevation angle of each of a plurality of second scatterers in the landing zone; and
integrate the first polarization elevation angle matrix and the second polarization elevation angle matrix to form an integrated elevation angle matrix that identifies the first scatterers and the second scatterers with respect to the landing zone.

12. The radar assembly of claim 11, wherein to generate the first polarization elevation angle matrix, the controller is further configured to:
transmit, for an azimuth beam position of a plurality of azimuth beam positions within the landing zone, by the antenna, radar signals comprising a stepped frequency high range resolution (HRR) waveform having the first polarization sense;
receive reflected radar signals having the first polarization sense from the transmitted radar signals;
generate, based on the reflected radar signals, a first polarization sum channel coarse range bin matrix and a first polarization difference channel coarse range bin matrix;
generate, based on the first polarization sum channel coarse range bin matrix, a first polarization sum channel HRR profile;
generate, based on the first polarization difference channel coarse range bin matrix, a first polarization difference channel HRR profile; and
generate, based on the first polarization sum channel HRR profile and the first polarization difference channel HRR profile, a plurality of cells in the first polarization elevation angle matrix that correspond to areas in the landing zone within the azimuth beam position.

13. The radar assembly of claim 12, wherein each cell of the plurality of cells comprises an elevation angle that identifies an elevation of at least one first scatterer or second scatterer within a corresponding area of the landing zone.

14. The radar assembly of claim 11, wherein the controller is further configured to:
generate, based on the integrated elevation angle matrix, an image representative of a height of at least some of the first scatterers and some of the second scatterers with respect to the landing zone; and
present the image on a display.

15. The radar assembly of claim 14, wherein the controller is further configured to:
determine a threshold height;
determine, based on the integrated elevation angle matrix, each first scatterer and each second scatterer having a height above the threshold height; and
generate the image representative of the height of each first scatterer and each second scatterer having a height above the threshold height with respect to the landing zone.

16. The radar assembly of claim 11, wherein the first polarization elevation matrix comprises a plurality of cells, each cell corresponding to an area in the landing zone, and comprising an elevation angle that identifies an elevation of at least one first scatterer or second scatterer within the area.

17. The radar assembly of claim 11, wherein at least some of the first scatterers are the same scatterers as some of the second scatterers.

18. The radar assembly of claim 11, wherein the first polarization elevation angle matrix is generated based on a sum channel and at least one difference channel of a monopulse antenna.

19. The radar assembly of claim 18, wherein the second polarization elevation angle matrix is generated based on the sum channel and the at least one difference channel of the monopulse antenna.

20. A radar system for use in an aircraft, comprising:
a missile interface configured to communicate with a radar assembly in a missile; and
a controller coupled to the missile interface, and configured to:
generate a first polarization elevation angle matrix based on first radar data received via the missile interface, the first radar data based on reflected radar signals having a first polarization sense, the first polarization elevation angle matrix corresponding to a landing zone and identifying an elevation angle of each of a plurality of first scatterers in the landing zone;
generate a second polarization elevation angle matrix based on second radar data received via the missile interface, the second radar data based on reflected radar signals having a second polarization sense that differs from the first polarization sense, the second polarization elevation angle matrix corresponding to the landing zone and identifying an elevation angle of each of a plurality of second scatterers in the landing zone; and
integrate the first polarization elevation angle matrix and the second polarization elevation angle matrix to form an integrated elevation angle matrix that identifies the first scatterers and the second scatterers with respect to the landing zone.

* * * * *